United States Patent [19]

Ringwall

[11] Patent Number: 4,468,617

[45] Date of Patent: Aug. 28, 1984

[54] VELOCITY SENSOR AND METHOD OF PRODUCING A VELOCITY SIGNAL

[75] Inventor: Carl G. Ringwall, Scotia, N.Y.

[73] Assignee: General Electric Company, Schenectady, N.Y.

[21] Appl. No.: 347,850

[22] Filed: Feb. 11, 1982

[51] Int. Cl.³ .......................... G01P 3/52; G01P 13/00
[52] U.S. Cl. ................................... 324/165; 324/160; 250/231 SE
[58] Field of Search .................... 307/515, 514, 516; 324/165, 83 Q, 160; 375/77; 455/109; 332/45, 48, 41; 250/231 SE; 356/138; 340/870.28, 870.29

[56] References Cited

U.S. PATENT DOCUMENTS

| | | | |
|---|---|---|---|
| 2,659,050 | 11/1953 | Honey | 324/83 Q X |
| 3,453,550 | 7/1969 | Kuck | 307/516 X |
| 3,501,651 | 3/1970 | Cottrell | 307/515 |

OTHER PUBLICATIONS

Electrical Engineers' Handbook, Electric Communication and Electronics, 4th edition, 1950, John Wiley & Sons, Inc., p. 7-71.

Weaver: "A Third Method of Generation and Detection of Single Side Band Signals"-Proceedings of the IRE; 12/1956; pp. 1703-1705.

*Primary Examiner*—Stanley T. Krawczewicz
*Assistant Examiner*—Jose M. Solis
*Attorney, Agent, or Firm*—Donald R. Campbell; James C. Davis, Jr.; Paul R. Webb, II

[57] ABSTRACT

A high quality velocity signal is generated from an incremental position encoder, thus eliminating the DC tachometer in robot and machine tool closed loop control systems. The encoder signals are used to amplitude modulate the outputs of a high frequency oscillator. Two side band frequencies equal to the sum and difference of the encoder and oscillator frequencies are produced and converted to analog voltages and summed to yield a speed signal. This signal is continuous through zero rate and has a polarity determined by direction of rotation.

15 Claims, 4 Drawing Figures

VELOCITY SENSOR AND METHOD OF PRODUCING A VELOCITY SIGNAL

BACKGROUND OF THE INVENTION

High performance closed loop position controllers require a high quality rate signal for stabilization and rate scheduling. DC tachometers are used almost exclusively to generate this signal. On a multi-axes robot, making provision for a DC tachomter on each axis imposes severe constraints on the mechanical design. On the hand and wrist axes of a robot, for example, the size and cost of the DC tachometer may be comparable to the drive motor, and the additional leads required by the tachometer impose design penalties. In particular with robots there is a strong incentive to minimize the number of sensors carried on the machine.

The incremental position encoder commonly used in robot and machine tool closed loop control systems generates N sinusoidal cycles per rotation of the encoder shaft. Two channels with a relative phase shift of 90° are normally used to determine direction of rotation. These signals are converted to pulsed outputs and accumulated in up-down counters to yield position information.

Digital encoders have been extensively used as tachometers in velocity control systems. In these systems the encoder can be scaled to yield a high sampling rate at the nominal control velocity. Direction sense is not required, consequently counting the number of pulses per unit of time and converting to an analog voltage yields an adequate velocity signal. However, in a position control system velocity must be controlled over a wide range including through and at zero and for both negative and positive velocities. Because of the quantized output of the digital encoder a high performance system will have a limit cycle instability at or near zero velocity. The result is excessive power dissipation in power drives and rough velocity control at low velocities.

A functional block diagram of the disclosed system is similar to the function required to produce an amplitude modulated suppressed carrier radio wave. The present application and specific implementation are not suggested by the prior art.

SUMMARY OF THE INVENTION

The dual channel phase shifted outputs of a rotary or a linear incremental position encoder, whose frequency and phase relation depend on the rate and direction of movement of an object to which the encoder is adapted to be attached, are utilized to provide a continuous velocity signal with a polarity that designates the direction of movement. The quality of this signal is compatible with high performance position loops used in the control of robots and machine tools.

The method of producing the velocity signal is practiced by generating a high frequency carrier, amplitude modulating the carrier with said encoder outputs, and processing the resulting products to produce two side bands with the carrier suppressed. The frequency of one side band is equal to the sum of the encoder output and carrier frequencies and the other to the difference. The two side band frequencies are processed to yield a speed signal which is continuous through zero rate.

The rate sensor according to an illustrative embodiment is comprised of a source of a carrier with sine and cosine components, such as a high frequency oscillator and an inverter, first means for combining the encoder and oscillator outputs, second means for producing from the resulting products two side band frequencies equal to the sum and difference of encoder and oscillator frequencies, and third means for deriving positive and negative velocity signals by converting the side band frequencies to analog voltages and taking their difference. A system is disclosed which generates an angular velocity signal proportional to the rate of rotation of the encoder. The sampling time of the sensor is small and determined by the oscillator frequency.

DESCRIPTION OF THE PREFERRED EMBODIMENTS

Figure 1:
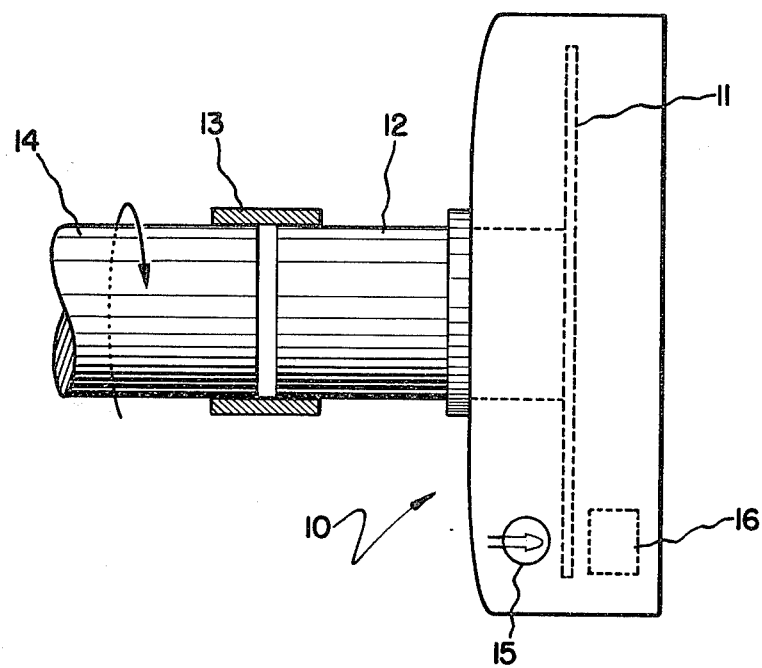
FIG. 1 is a side view of a position encoder attached to a shaft and, in dashed lines, a sketch of internal components.
Figure 2:
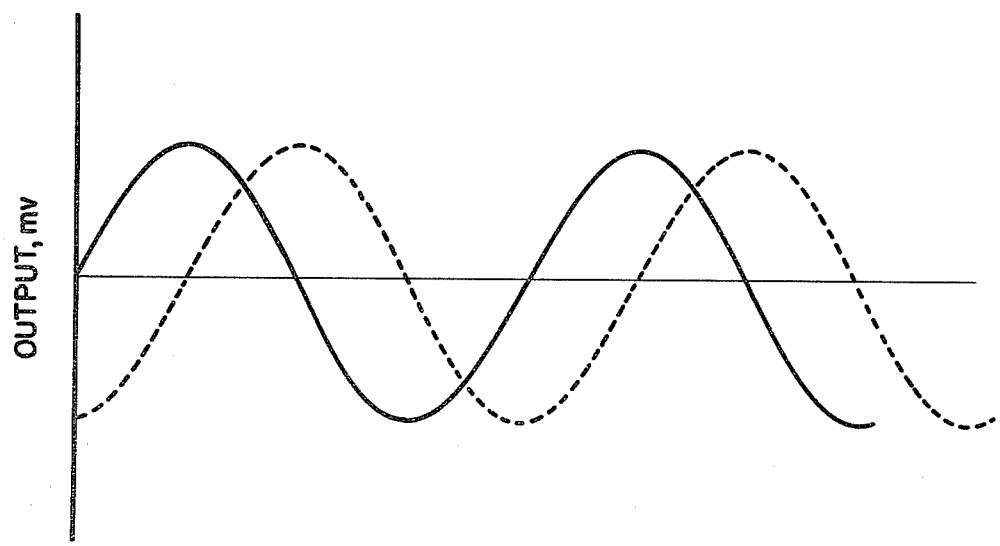
FIG. 2 is a waveform diagram of the photocell outputs from one encoder.

The representative incremental position encoder 10 in FIG. 1 has a coded disk 11 that rotates with the encoder shaft 12, which in turn is attached by a coupler 13 to an object such as the end of a lead screw 14. The disk is illuminated by a light source 15 and has a circular track of evenly spaced windows which alternately transmit light to a photocell 16 and block light. The typical incremental encoder has two channels giving N cycles of an approximately sinusoidal or triangular wave signal for each turn of the encoder shaft. FIG. 2 shows the photocell outputs in millivolts of one suitable optical encoder, Model KT-23A sold by Renco Corporation, Goleta, Calif. One channel of this or another encoder is designated a reference with an output given by $\sin(N\omega_\theta t)$, where $\omega_\theta$ is the rate of shaft rotation in radian/sec. The second channel is identical to the first except it is phase shifted by 90°. For one direction of rotation the phase leads the first channel by 90° and for the other direction it lags by 90°. The output of this channel is designated by $\pm\cos(N\omega_\theta t)$. The frequency and phase relation of the encoder output signals, then, depend on the rate of movement and direction of movement of the encoder shaft and the object to which the movable parts of the encoder are attached.

Figure 3:
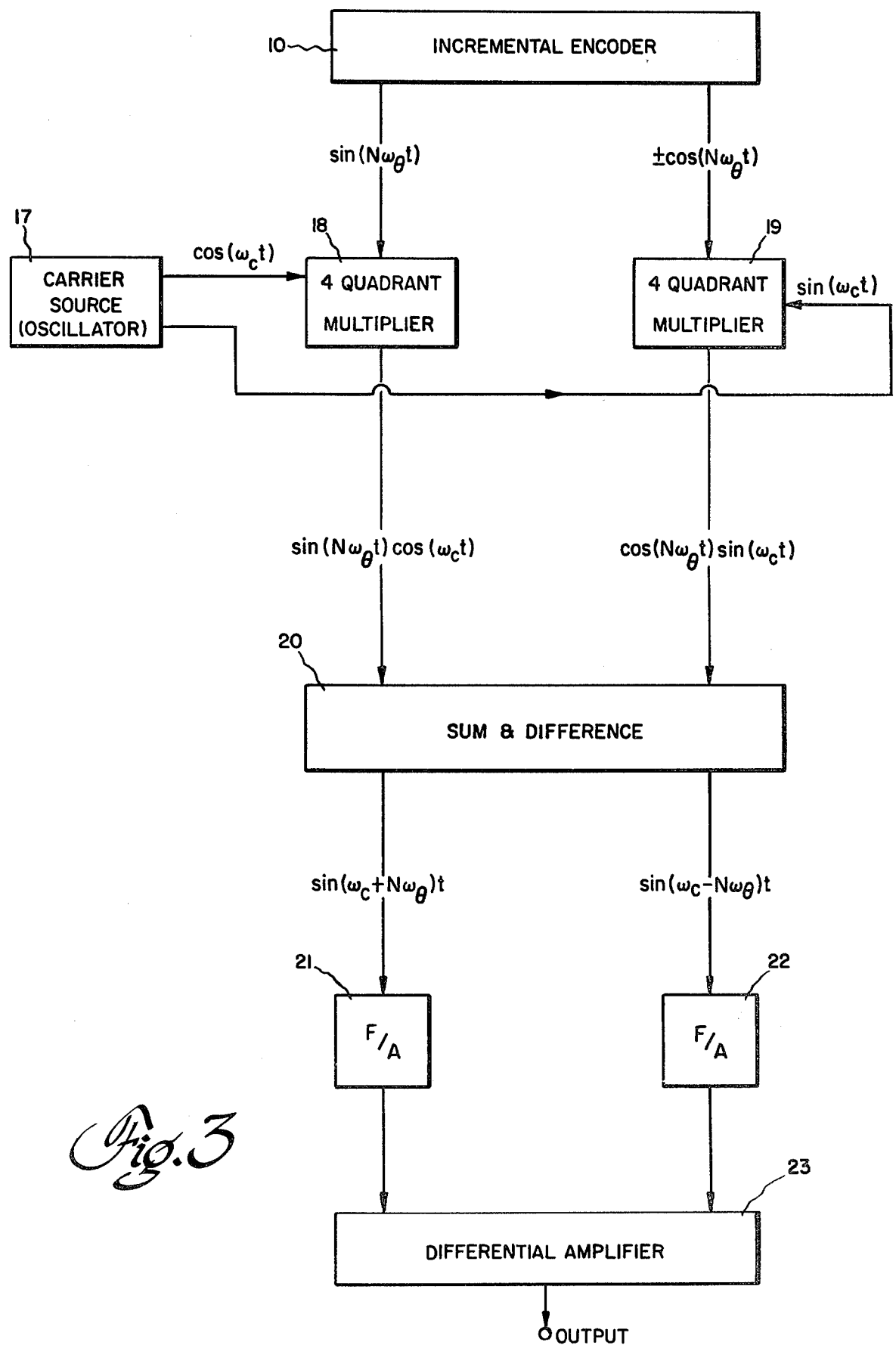
FIG. 3 is a functional block diagram of the rate sensor.

Referring to the block diagram of the rate sensor in FIG. 3, a source 17 of carrier waves is provided which is typically an oscillator. The high frequency carrier ($\omega_c$) has sine and cosine components, $\sin(\omega_c t)$ and $\cos(\omega_c t)$. The two encoder signals are combined with the high frequency carrier components, in four quadrant multipliers 18 and 19. The outputs of the four quadrant multipliers are the products $\sin(\omega_c t)\cos(N\omega_\theta t)$ and $\cos(\omega_c t)\sin(N\omega_\theta t)$. The two outputs are fed to sum and difference circuitry 20 to yield two side bands $\sin(\omega_c+N\omega_\theta)t$ and $\sin(\omega_c-N\omega_\theta)t$ with the carrier suppressed. The side bands are each converted to an analog voltage by frequency-to-analog converters 21 and 22 and are applied to a differential amplifier 23.

The output of the differential amplifier 23 is an analog voltage proportional to the angular rotation rate of the encoder shaft with the polarity dependent on direction of rotation. When the lead screw 14 and encoder shaft 12 are not rotating (N=0), the carrier sin($\omega_c t$) remains on both sides, the outputs of the F/A converters are the same, and the output of the differential amplifier is zero. With the shaft turning in one direction, the output of F/A converter 21 is high and that of F/A converter 22 is low, and the velocity signal has a positive polarity. For reverse rotation, the output of F/A converter 22 is high and that of F/A converter 21 is low, and the velocity signal has a negative polarity. The sensor has infinite resolution with a sampling rate equal to the period of the carrier frequency at zero rate. The sensor output signal is indicative of angular velocity in radians/sec. If a linear incremental position encoder replaces the rotary position encoder and the two encoder signals are processed in the same way, the sensor output signal is proportional to linear velocity in inches/sec or meters/sec. In either case, the velocity signal is continuous through zero rate and the polarity designates direction of motion.

The improved method of generating a velocity signal from a position encoder is reviewed. The incremental encoder has dual channel approximately sinusoidal outputs, one of which is 90° phase shifted. A high frequency carrier is generated, and the encoder outputs are used to amplitude modulate the carrier. Two side bands are produced whose frequencies are the sum and difference of the encoder output and carrier frequencies, with the carrier suppressed. The side bands are processed to yield the continuous output signal which is indicative of velocity. The side band frequencies are converted to analog voltages which are algebraically summed to yield the positive or negative velocity signal.

Figure 4:
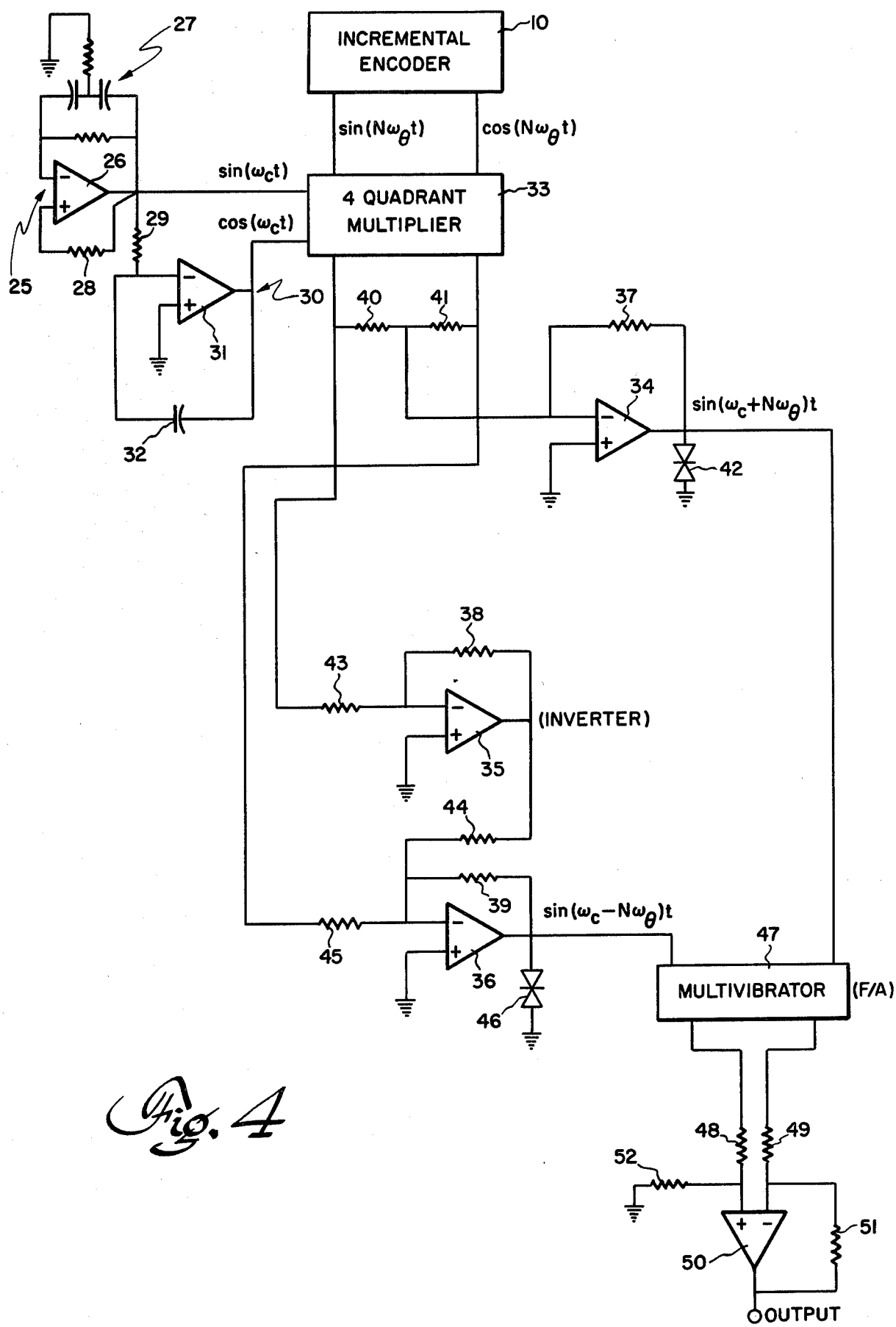
FIG. 4 is a detailed circuit diagram of the preferred embodiment of the sensor.

The circuit diagram of the preferred embodiment of the velocity sensor is given in FIG. 4. Six operational amplifiers are used (type 5534 or equivalent). A negative feedback oscillator 25 has a typical output frequency of 30 KHz, relatively high as compared to the frequency of the encoder signals. Operational amplifier 26 has a RC network 27 connected between its output and inverting input, and a positive feedback resistor 28 between the output and noninverting input. The oscillator output is fed through a resistor 29 to a phase shifter 30 comprised of an amplifier 31 and a negative feedback capacitor 32 to get a 90° phase shift. The oscillator output and phase shifted output are applied to a four quadrant multiplier 33 such as a type SSM2000 chip which combines two multipliers in a common chip. An alternative implementation could use two type MC1595 chips. The first encoder output and second phase shifted output are respectively multiplied with the cosine and sine carrier components.

Three summing amplifiers are provided, comprised of operational amplifiers 34–36 which have feedback resistors 37–39. The first of these sums the outputs of multipliers 33 to form the upper side band, the sum of the oscillator and the encoder frequency. The products are fed through input resistors 40 and 41 to the inverting terminal of amplifier 34, and a bidirectional conducting Zener diode 42 limits the output to +5 volts and clips the negative. Amplifier 35 is an inverter; one of the multiplier outputs passes through input resistor 43 to the amplifier where it is inverted and fed through a resistor 44 to the summing junction of amplifier 36. The other product of multipliers 33 passes through input resistor 45 to the summing junction. In this amplifier the lower side band is formed, the difference of the oscillator and encoder frequencies. Zener diode 46 performs the same function as Zener diode 42.

The frequency-to-analog converters are a dual one shot digital multivibrator 47 such as a type 74123 chip, and convert the upper and lower side band frequencies to analog voltages. The two outputs are presented to input resistors 48 and 49 and applied to differential amplifier 50 which has feedback resistors 51 and 52, the latter to give a symmetrical output on the operational amplifier. The output of amplifier 50 is a positive or negative analog voltage proportional to encoder rotation rate. The polarity designates direction of rotation.

One application is to generate rate signals on the wrist and roll axes of a robotic programmed assembly machine. It may replace the DC tachometers on all the axes, such as the X, Y, Z, and $\theta$ axes of the robotic machine in copending application Ser. No. 294,588, filed on Aug. 20, 1981 by D. C. Peroutky, now abandoned, and continuation application Ser. No. 551,784, filed Nov. 14, 1983, which is assigned to the same assignee.

While the invention has been particularly shown and described with reference to preferred embodiments thereof, it will be understood by those skilled in the art that the foregoing and other changes in form and details may be made therein without departing from the spirit and scope of the invention.

The invention claimed is:

1. A velocity sensor comprising:
   an optical position encoder having output signals whose frequency and phase relation depend on the rate and direction of movement of an object to which the encoder is adapted to be attached;
   a source of a high frequency carrier;
   means for modulating said carrier with said encoder output signals; and
   means for producing two side band frequencies that are the sum and difference of said carrier and encoder output frequencies, and for deriving therefrom a positive or negative velocity signal that is continous through zero rate and whose polarity designates the direction of movement.

2. The sensor of claim 1 wherein said last-mentioned means includes means for converting said side band frequencies to analog voltages which are algebraically summed to yield said positive or negative velocity signal.

3. The sensor of claim 1 wherein said encoder output signals are approximately sinusoidal and include a first output and 90° phase shifted second output, and said carrier has sine and cosine components, said first-mentioned means including means for multiplying said first and second encoder outputs respectively with said cosine and sine carrier components, and said last-mentioned means comprising means for summing and subtracting the resulting products and converting each to an analog voltage.

4. The sensor of claim 3 and means for taking the difference between said analog voltages which is said positive or negative velocity signal.

5. A velocity sensor comprising:
   an incremental position encoder that has output signals in phase quadrature whose frequency and phase relation depend on the rate and direction of rotation of an object to which the encoder is adapted to be attached;
   high frequency oscillator means having 90° phase shifted outputs;
   first means for combining said encoder signals and oscillator outputs;

second means for producing from the resulting products two side band frequencies equal to the sum and difference of said encoder signal and oscillator frequencies; and third means for deriving a continuous output signal that is indicative of angular velocity and has a polarity which designates the direction of rotation.

6. The sensor of claim 5 wherein said third means comprises means for converting said side band frequencies to analog voltages and for summing said analog voltages.

7. The sensor of claim 5 wherein said oscillator means is comprised of a negative feedback oscillator and a 90° phase shifter.

8. The sensor of claim 7 wherein said first means is comprised of a four quadrant multiplier.

9. The sensor of claim 8 wherein said second means is comprised of first and second summing amplifiers and an inverter.

10. The sensor of claim 9 wherein said third means is comprised of frequency-to-analog converters and a differential amplifier.

11. The method of generating a velocity signal from an incremental position encoder comprising the steps of:

providing dual channel 90° phase shifted outputs from the incremental position encoder whose frequency and phase relation depend on the rate and direction of movement of the encoder;

generating a high frequency carrier;

amplitude modulating said carrier with said encoder outputs;

producing two side bands whose frequencies are the sum and difference of said encoder output and carrier frequencies, with the carrier suppressed; and processing said side bands to yield an output signal indicative of velocity that is continuous through zero rate and has a polarity which designates the direction of movement.

12. The method of claim 11 wherein a carrier with sine and cosine components is generated.

13. The method of claim 12 wherein said carrier is modulated by combining said encoder outputs and carrier components.

14. The method of claim 13 wherein said side bands are produced by taking the sum and difference of the products of the foregoing modulating step.

15. The method of claim 14 wherein said side bands are processed by converting the side band frequencies to analog voltages and taking the difference of said analog voltages.

* * * * *